United States Patent Office 3,515,254
Patented June 2, 1970

3,515,254
CONVEYOR SYSTEM HAVING COMPUTER FOR FINDING THE CENTERS OF OBJECTS BEING CONVEYED
Leo A. Gary 5135 Lockwood Ave., Chicago, Ill. 60638
Filed Aug. 27, 1968, Ser. No. 755,684
Int. Cl. B65g 47/42
U.S. Cl. 198—21                                21 Claims

ABSTRACT OF THE DISCLOSURE

The disclosed conveyor system comprises a conveyor for carrying a series of irregular objects such as mail sacks. The objects are deposited on the conveyor by an induction device. The passage of the leading and trailing edges of each object are detected by a sensor. In response to the passage of the leading edge the sensor causes an electronic up-down counter to start counting up in response to normal frequency pulses from a pulse source. The sensor stops the up-down counter in response to the passage of the trailing edge. When the object reaches a predetermined position along the conveyor, the counter is caused to start counting down in response to double frequency pulses. When the counter has counted down to a count of 0, a control function is initiated. In this way, the control function is timed to correspond with a predetermined position of the center of each successive object. Such control function may comprise the operation of a paddle for pushing the object laterally from the conveyor, either immediately or after a predetermined delay.

---

This invention relates to conveyor systems and pertains particularly to a system in which successive objects of irregular shape are carried along a conveyor, and then are diverted or pushed off the conveyor at one or more positions along the conveyor. Such conveyor systems will find many applications, but are particularly applicable to the sorting of mail sacks. In such system, a series of sacks of different shapes and sizes are deposited on the conveyor. Each sack is coded according to destination. After traveling along the conveyor the sacks are pushed off the conveyor at different points, according to destination, and are carried away by branch conveyors.

In such conveyor systems, difficulties have arisen in connection with the timing of the paddles or other devices which are employed to push the sacks off the conveyor. It has proven to be difficult to time the paddles so that they engage the sacks on center, particularly when the sacks are of widely different sizes. The tendency has been for the paddles to engage the sacks off-center, with the result that the sacks have sometimes been pushed off the conveyor at the wrong angle so that the sacks spill off at the conveyor rather than moving smoothly to the branch conveyors.

One principal object of the present invention is to provide a conveyor system having a computer capable of locating the center of each successive object which passes along the conveyor. In this way, a control function, such as the operation of a paddle, can be timed in exact correspondence with the position of the center of each successive object.

Generally speaking, this is accomplished, in accordance with the present invention, by providing a sensor, disposed along the conveyor, for sensing the passage of the leading and trailing edges of each object. In response to the passage of the leading edge, the sensor causes an electronic up-down counter to start counting up in response to normal frequency timing pulses. In response to the passage of the trailing edge, the sensor causes the counter to stop counting. Thereafter, when the object reaches a desired position, the counter is caused to start counting down in response to double frequency timing pulses. A control function is initiated when the counter reached a count of 0. At this time, the center of the object is passing the desired position, so that the control function is timed in exact accordance with the position of the center. The control function may be performed immediately, or may be delayed to provide for movement of the center of the object along the conveyor to any one of a series of different positions.

Further objects and advantages of the present invention will appear from the following description, taken with the accompanying drawings, in which.

Figure 1:
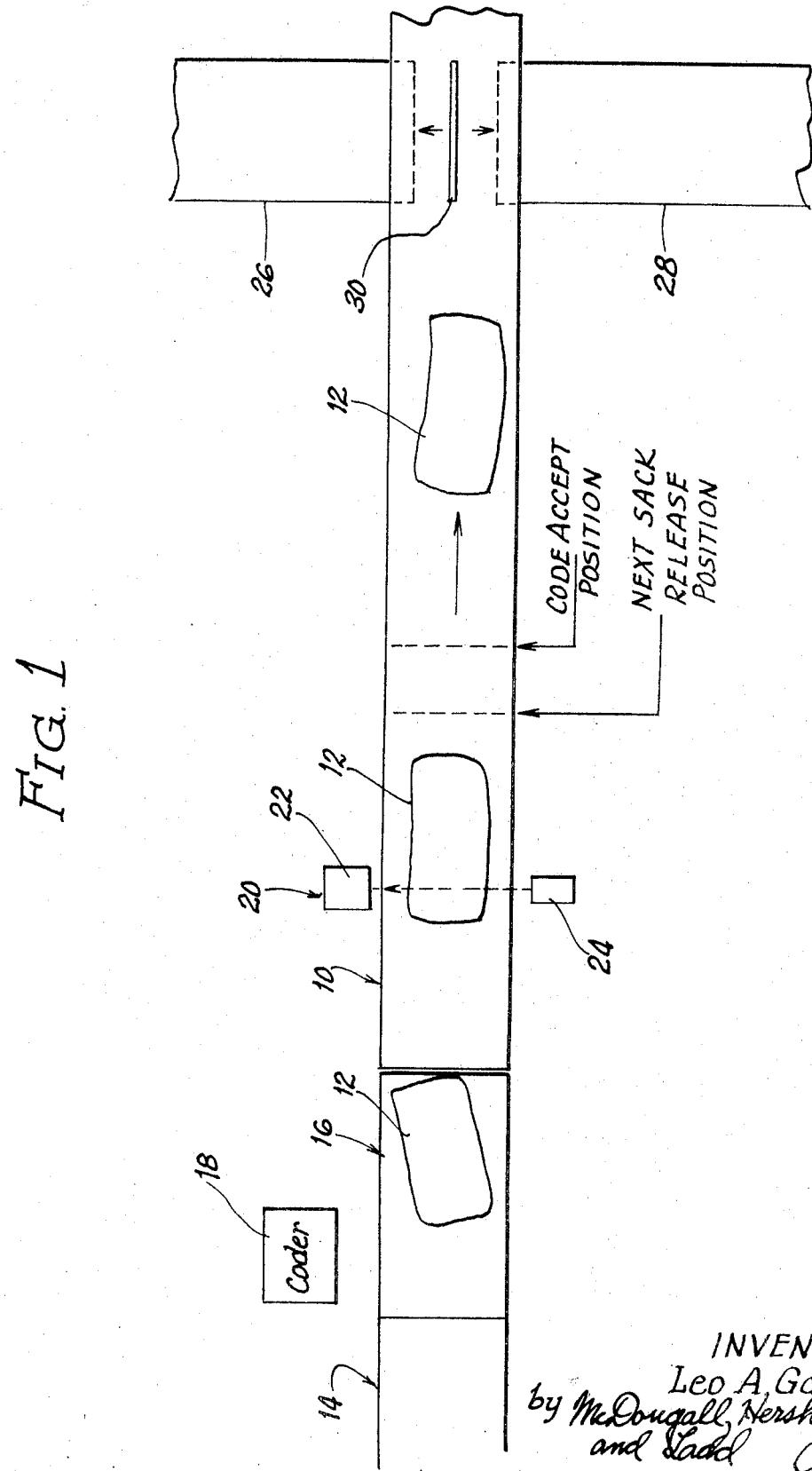
FIG. 1 is a diagrammatic plan view of a conveyor system to be described as an illustrative embodiment of the present invention.

It will be seen that FIG. 1 illustrates an embodiment of the present invention, comprising a conveyor 10, which may be of the endless belt type, or any other suitable type. The conveyor 10 is adapted to handle mail sacks, or various other similar objects 12 of irregular size and shape. The basic purpose of the conveyor 10 is to assist in the sorting of the mail sacks or other objects 12. Thus, the sacks 12 may be sorted in accordance with the destination of the sacks.

In the illustrated arrangements, the sacks or other objects 12 are delivered to the main conveyor 10 by a supply conveyor 14, which may also be of the endless belt type, or any other suitable type. An induction device 16 is provided between the supply conveyor 14 and the main conveyor 10. The purpose of the induction device 16 is to hold each mail sack, and then drop the sack upon the conveyor 10 at the proper time, as determined by the control system for the conveyor 10. Any known or suitable induction device may be employed.

It is preferred to station an operator adjacent the induction device 16. The operator reads the destination label on each sack and enters the destination, and any other desired information, on a coder 18, which is a component of the control system for the conveyor 10. Any known or suitable coder may be employed. The coder 18 may be of the type having a keyboard for recording the destination of each sack, in the form of a number or other code.

After each sack has been coded it is dropped upon the conveyor 10 by the induction device 16. The sack is carried by the conveyor 10 so that the sack passes a sensing device 20, of any known or suitable type, capable of sensing the passage of the leading and trailing edges of the sack. Thus, the sensing device 20 may comprise a photocell 22 and a light source 24, on opposite sides of the conveyor. The beam from the light source 24 normally falls upon the photocell 22, but is adapted to be interrupted by each sack or other object which passes along the conveyor.

After passing along the conveyor 10, each sack or other object 12 is diverted or pushed off the conveyor 10 so that the sack is carried away by any one of a series of branch conveyors. Two such branch conveyors 26 and 28 are shown in FIG. 1, extending from opposite sides of the main conveyor 10, but it will be understood that any desired number of branch conveyors may be provided. Normally, a branch conveyor is provided for each coded destination, so that the sacks will be sorted onto the branch conveyors in accordance with the various destinations of the sacks.

The sacks or other objects 12 are diverted or pushed off the conveyor 10 by a plurality of sack-removing devices 30. The sack removing devices 30 may be of any known or suitable construction. In the illustrated arrangement, each sack removing device 30 is in the form of a mechanically operable paddle which is capable of moving across the conveyor 10 in either lateral direction, so as to push any of the sacks upon either of the conveyors 26 and 28.

In prior sorting arrangements of this general type, difficulties have been experienced in timing the operation of the paddle so that it will engage each sack on center. Such engagement is desirable, so that the sack will be pushed directly off the main conveyor, without any tendency to twist or turn. If the paddle engages the sack off-center, the sack may actually be pushed off the main conveyor at such an inaccurate angle that it will miss the branch conveyor and tumble off the main conveyor onto the floor.

Figure 2:
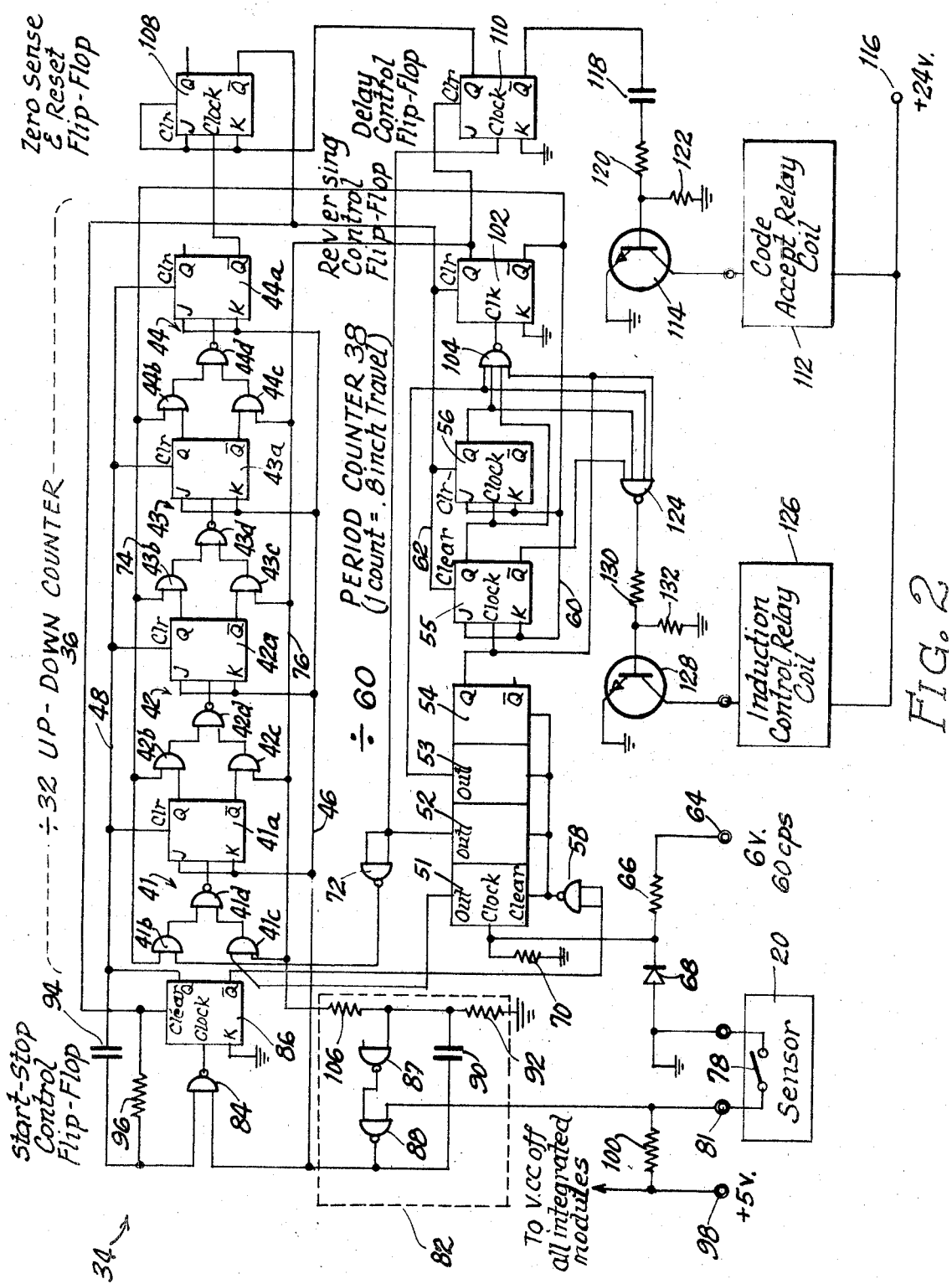
FIG. 2 is a circuit diagram of the computer for finding the center of each successive object which moves along the conveyor of FIG. 1.

To overcome these difficulties, the conveyor system is provided with the control circuit or computer 34 of FIG. 2, which locates the center of each sack or other object, and initiates the operation of the paddle 30 in timed relation to the position of the center as it moves along the conveyor 10. Generally speaking, the computer 34 comprises an up-down electronic counter 36 which is supplied with clock pulses by a period counter 38. When the sensor 20 detects the leading edge of each sack, the up-down counter 36 is caused to start counting up. This count is stopped when the sensor 20 detects the trailing edge of the sack. When the leading edge of the sack reaches a predetermined position, in relation to the sensor 20, the up-down counter 36 is caused to start counting down, at twice the rate of the up count. Thus, the up-down counter 36 reaches a count of 0 when the center of the sack is passing the predetermined position. In this way, the computer locates the center of the sack. A control function is then initiated, either immediately or after a predetermined delay, to allow the center of the sack to travel to one of the branch conveyors. Such control function may consist of the operation of one of the paddles. In this way, the operation of the paddle will be timed to coincide with the passage of the center of the sack.

Further details of the control system or computer 34 will be evident from FIG. 2. The illustrated up-down counter 36 comprises four binary stages 41, 42, 43 and 44. Each stage comprises a J-K flip-flop and a set of 2-wide 2-input and-or-invert gates. Thus, the first stage 41 comprises a J-K flip-flop 41a and a set of gates 41b, c and d. The flip-flops and gates for the other three stages 42-44 are similarly designated on the drawings. The gates 41b and c are and gates, having their outputs feeding into the gate 41d, which is an invert-or gate. The output of the gate 41d feeds into the clock input of the flip-flop 41a. The $\bar{Q}$ and $\bar{Q}$ outputs of the flip-flop 41a are connected to inputs of the next stage gates 42b and c. As to all of these details, the same arrangement prevails in all of the stages 41-44, except for the output of the last stage 44, which will be described presently.

The J-K inputs of all four flip-flops 41a-44a go to a control line 46, while the reset input of the flip-flops go to a control line 48.

The flip-flops and gates are preferably in the form of integrated circuits. Thus, for example, each of the flip-flops 41a-44a may comprise an integrated circuit type SN7470N. Each set of three gates, such as the gates 41b, 41c and 41d, may comprise one-half of an integrated circuit type SN7451N. It will be understood that various other specific types of integrated circuits may be employed.

The illustrated period counter 38 may assume various forms, but is illustrated as comprising six binary stages 51-56. Each stage is preferably in the form of a flip-flop. The first four stages 51-54 are preferably incorporated into a single integrated circuit, which may be of the type designated SN7493N. The integrated circuit may also comprise a gate 58 having its output connected to the reset inputs of the flip-flops 51-54.

The flip-flops 55 and 56 are preferably in the form of J-K master-slave flip-flops, both of which may be incorporated into a single integrated circuit, which may be of the type designated SN7473N. The J-K input lines of the flip-flops 55 and 56 are connected to a control line 60, while the reset inputs are connected to a control line 62. The Q output of the flip-flop 54 is connected to the clock input of the flip-flop 55. Similarly, the Q output of the flip-flop 55 is connected to the clock input of the flip-flop 56.

For convenience, the clock input pulses for the first flip-flop 51 may be derived from the 60-cycle alternating current supply. Thus, a 60-cycle input, at 6 volts or some other suitable voltage, is applied between a supply terminal 64 and ground. In this case, a resistor 66 and a diode 68 are connected between the terminal 64 and ground. The rectified pulses across the diode 68 are supplied to the clock input of the flip-flop 51. In this case, a resistor 70 is connected between the clock input and ground.

It will be understood that each of the stages 51-56 divides the frequency by two. The output of one stage is fed to the up-down counter 36 for counting up, while the output of the preceding stage is fed to the up-down counter for counting down. Thus, the down-counting input pulses are at double the frequency of the up-counting pulses. In this way, the down-counting operation proceeds twice as fast as the up-counting operation.

In the specific arrangement of FIG. 2, the quarter frequency pulses at the output of the second stage 52 are employed for counting up. Thus, the output of the second stage 52 is connected through an inverting gate 72 to one input of the gate 41b. The other input of the gate 41b is connected to a control line 74, to which one input of each of the other gates 42b-44b is also connected.

Similarly, the output of the first flip-flop 51 is connected to one input of the gate 41c. The other input of the gate 41c is connected to a control line 76, which also is connected to the corresponding input of each of the other gates 42c-44c. Thus, the gates 41b-44b are used for counting up, while the gates 41c-44c are used for counting down.

The sensor 20 is employed to initiate the operation of the up-down counter 36 and the basic period counter 38. As shown, the sensor 20 comprises a switch 78 which is normally open, but is closed when a sack or other object is passing the sensor. The switch 78 may take the form of a pair of relay contacts, adapted to be closed by the photocell 22. It will be seen that the sensor switch 78 is connected between grounded and ungrounded input terminals 80 and 81.

Various means may be employed to initiate the operation of the counters 36 and 38 in response to the closure of the sensor switch 78. In the specific arrangement of FIG. 2, a monostable circuit 82, a gate 84 and a start-stop control flip-flop 86 are connected between the input terminal 81 and the counters 36 and 38. The illustrated monostable circuit 82 comprises gates 87 and 88, which may be of the N-and type. The output of the gate 87 is connected to one input of the gate 88. The other input is connected to the input terminal 81. It will be seen that the output of the gate 88 is connected to one input of the gate 84. Moreover, the output of the gate 88 is connected to the J-K control line 46 for the flip-flops 41a-44a of the up-down counter 36.

A feedback capacitor 90 is connected between the output of the gate 88 and one input of the gate 87. A resistor 92 is connected between such input and ground.

It will be seen that a feedback capacitor 94 is connected between the Q output of the flip-flop 86 and one input of the gate 84. A resistor 96 is connected between such input and the clear input of the flip-flop 86.

The start-stop control flip-flop 86 is employed to control the counters 36 and 38. Thus, the Q output of the flip-flop 86 is connected to the reset or clear line 48 for the flip-flops 41a–44a of the counter 36. The $\bar{Q}$ output of the flip-flop 86 is connected to the inputs of the gate 58, which feeds into the reset inputs of the flip-flops 51–54.

The gates 72, 84, 87 and 88 may conveniently be components of a single integrated circuit, which may be of the type designated SN7400N. The flip-flop 86 may comprise one-half of an integrated circuit type SN7473N.

When the sensor switch 78 is open, the input terminal 81 is energized with a voltage supplied thereto from an input terminal 98 through a resistor 100. The terminal 98 may be supplied with a positive input at 5 volts or some other suitable voltage. When the sensor switch 78 is closed, the voltage at the input terminal 81 goes to 0.

It will be recalled that the sensor switch 78 is closed when the leading edge of a sack or other object passes the sensor 20. The closure of the sensor switch 78 causes the monostable circuit 82 to go high, so that a pulse is fed through the gate 84 to the clock input of the start-stop control flip-flop 86. This causes the flip-flop 86 to complement so that the $\bar{Q}$ output goes low. The high output of the monostable circuit 82 is applied to the J–K control line 46 so as to activate the flip-flops 41a–44a. The signal from the $\bar{Q}$ output of the flip-flop 86 is applied to the gate 58 which activates the flip-flops 51–54.

Thus, the period counter 38 starts counting the 60-cycle input pulses. At the same time, the up-down counter 36 starts counting up in response to the quarter frequency pulses from the second stage 52.

The sensor switch 78 is opened when the trailing edge of the sack or other object passes the sensor 20. The opening of the switch 78 causes the monostable circuit 82 to go low. This low input is applied to the J–K control lines 46 of the flip-flops 41a–44a, so that these flip-flops become invulnerable to the clock pulses. Accordingly, the up-down counter 36 stops counting, but the count is preserved in the states then existing in the flip-flops. Of course, the up count achieved by the counter 36 is a direct measure of the length of the sack or other object.

It is preferred to allow the period counter 38 to continue to run until a predetermined count is achieved. At the predetermined count, the leading edge of the sack will have reached a definite position along the conveyor 10. The down count is then started at this position. When the down count reaches 0, the center of the sack will have arrived at the predetermined position. In this way, the center is definitely located so that a control function can be timed to correspond with the position of the center. Such control function can be initiated immediately, when the down count reaches 0, but usually is initiated after a predetermined delay, so that the center of the sack will have moved opposite one of the branch conveyors, such as the conveyors 26 and 28.

In this case, the down count is initiated when the period counter 38 reaches a count of sixty, which corresponds to one second of travel along the conveyor 10. If the conveyor is moving at four feet per second, for example, the leading edge of the sack will have traveled to a position four feet beyond the sensor 20. Such position is designated the CODE ACCEPT position in FIG. 1, because this is the position at which the location of the center of each sack is coded into the control system.

Means are provided to reverse the counter 36 so that it will count down. In the specific arrangement of FIG. 2, such means take the form of a reversing control flip-flop 102 which is caused to go high on the sixtieth count of the period counter 38. To achieve this operation, the output of a quadruple input and gate 104 is connected to the clock input of the flip-flop 102. The four inputs of the gate 104 are connected to the outputs of the third, fourth, fifth and sixth stages 53–56. These outputs combine on the sixtieth count to activate the gate 104, so that a clock pulse is fed to the reversing control flip-flop 102.

It will be seen that the Q output of the flip-flop 102 is fed to the control line 76 for the down counting gates 41c–44c. Thus, when the Q output goes high at the sixtieth count, the down counting gates are activated. The $\bar{Q}$ output of the flip-flop 102 is connected to the control line 74 for the up-counting gates 41b–44b. Thus, the up-counting gates are deactivated when the $\bar{Q}$ output goes low at the sixtieth count.

It will be seen that the J–K control line 60 for the flip-flops 55 and 56 are connected to the $\bar{Q}$ output of the reversing flip-flop 102. Thus, these flip-flops are rendered invulnerable to clock pulses at the sixtieth count.

The Q output of the reversing flip-flop 102 is also applied to the gate 87 through a resistor 106, with the result that the monostable circuit 82 is driven high when the Q output goes high. The high output of the monostable circuit 82 is applied to the J–K control line 46 for the flip-flops 41a–44a, with the result that the flip-flops are rendered vulnerable to clock pulses. Accordingly, the up-down counter 36 starts counting down.

On the down count, the counter 36 is supplied with half frequency pulses from the first stage 51, rather than quarter frequency pulses, as on the up count, so that the down count proceeds at twice the speed of the up count. At the count of 0, the desired control function is initiated. Moreover, both counters 36 and 38 are reset. In the specific arrangement of FIG. 2, these functions are performed by a 0 sense and reset flip-flop 108 which receives its input from the $\bar{Q}$ output of the fourth counter flip-flop 44a. The flip-flop 108 acts in conjunction with a delay control flip-flop 110, which insures that the flip-flop 108 will be operated on the down count only, and not on the up count of the counter 36. Thus, the reset input of the delay control flip-flop 110 is connected to the Q output of the reversing control flip-flop 102, so that the flip-flop 110 is activated when the flip-flop 110 goes high on the sixtieth count. The clock input of the delay control flip-flop 110 is connected to the output of the second counter stage 52, so that the clock input is supplied with quarter frequency pulses. Accordingly, the delay control flip-flop 110 is activated on the count of sixty and is driven high on the fourth count thereafter.

The delay control flip-flop 110 controls the activation of the 0 sense flip-flop 108. Thus, the Q output of the flip-flop 110 is connected to the J–K inputs of the flip-flop 108, and also to the reset input thereof. Accordingly, the 0 sense flip-flop 108 is invulnerable to clock pulses during the entire up count, but becomes vulnerable when the delay control flip-flop goes high during the initial portion of the down count.

The $\bar{Q}$ output of the 0 sense flip-flop 108 is connected to the reset line 62 for the flip-flops 55 and 56. This reset line is also connected to the reset input of the reversing control flip-flop 102. In addition, the $\bar{Q}$ output of the flip-flop 108 is connected to the reset input of the start-stop control flip-flop 86. It will be recalled that the reset line 48 for the up-down counter 36 is connected to the Q output of the start-stop flip-flop 86. Thus, the resetting of the flip-flop 86 also causes resetting of the counter flip-flops 41a–44a. Through the inverting action of the gate 58, the $\bar{Q}$ output of the flip-flop 86 causes resetting of the flip-flops 51–54.

When the reversing control flip-flop 102 is reset, its Q output causes resetting of the delay control flip-flop 110. Thus, all of the flip-flops are reset to their natural states, with the exception of the 0 sense flip-flop 108.

The output device is coupled to the circuit and is arranged to be operated when the up-down counter 36 counts down to 0. In the specific arrangement of FIG. 2, the resetting of the delay control flip-flop 110 is employed to actuate the output device. In this case, the output device comprises a CODE ACCEPT relay coil 112, adapted to be energized by a transistor 114. The relay coil 112 is connected between a positive power supply terminal 116 and the collector of the transistor 114. The emitter of the transistor 114 is grounded and thus is connected to the negative side of the power supply. In the illustrated arrangement, the $\overline{Q}$ output of the delay control flip-flop is coupled to the base of the transistor 114 through a capacitor 118 and a resistor 120. Another resistor 122 is connected between the base and ground.

When the flip-flop 110 is reset at the count of 0 on the up-down counter 36, the capacitor 118 produces a pulse of substantial duration at the emitter of the transistor 114, with the result that the relay coil 112 is energized momentarily. This initiates a control function, such as the operation of the paddle 30. At the count of 0, the center of the sack is passing the CODE ACCEPT position. If the paddle 30 were at this position, it would be actuated immediately. However, the paddle is actually some distance down the conveyor. Accordingly, the coder 18 introduces an appropriate delay after the relay coil 112 is energized, so that the paddle 30 will be actuated when the center of the sack is directly opposite the paddle. It will be understood that a series of paddles are normally employed. The delay introduced by the coder 18 depends upon the destination code which has been entered on the coder by the operator. In each case, the delay is such that the center of the sack is opposite the appropriate branch conveyor when the paddle is actuated. The paddle engages the sack on center so that the sack is pushed directly off the conveyor 10.

The various flip-flops are preferably in the form of integrated circuits. Thus, for example, the flip-flops 102 and 108 may be incorporated into a single integrated circuit of the type designated SN7473N. The flip-flops 86 and 110 may be incorporated in a single integrated circuit of the same type.

The control circuit 34 may also include means for operating the induction device 16 which drops each successive sack upon the conveyor 10. It is preferred to operate the induction device so that a uniform space will be maintained between the leading edges of successive sacks. For example, this spacing may be about six feet. The illustrated control circuit 34 is arranged to actuate the induction device 16 when the leading edge of each sack travels to a specific position beyond the sensor 20. Such position is designated NEXT SACK RELEASE POSITION in FIG. 1. This position is chosen to provide the desired spacing between the sacks, allowing for the time required for the induction device 16 to drop the sack.

In the specific arrangement of FIG. 2, the basic period counter 38 is employed to operate the induction device 16. Such operation is initiated at the count of forty-four, but, of course, the specific count may be varied. A quadruple input gate 124 is employed to bring about this operation on the count of forty-four. The inputs of the gate 124 are connected to the Q outputs of the flip-flops 53, 54 and 56, and the $\overline{Q}$ output of the flip-flop 55. With this arrangement, the gate 124 is activated on the count of forty-four.

Various means may be employed to energize the induction device 16. In the specific control circuit of FIG. 2, the induction device is adapted to be energized by a relay coil 126, connected between the positive power supply terminal 116 and the collector of a transistor 128. The emitter of the transistor is grounded. A resistor 130 is connected between the output of the gate 124 and the base of the transistor 128. Another resistor 132 is connected between the base and ground. When the gate 124 is activated, the transistor 128 becomes conductive so that the induction control relay coil 126 is energized. In this way, the induction device 16 is actuated. The transistors 114 and 128 may be of various types, such as type 2N3704.

It may be helpful to summarize the operation of the control circuit 34. When the leading edge of each sack or other object passes the sensor 20, the sensor switch 78 is closed, with the result that the monostable circuit 82 goes high. The high output is fed to the start-stop control flip-flop 86 through the gate 84, with the result that the flip-flop 86 complements. The $\overline{Q}$ output of the flip-flop 86 activates the period counter flip-flops 51–54 so that they start counting the 60-cycle pulses.

The high output from the monostable circuit 82 is also applied to the J–K inputs of the up-down flip-flops 41a–44a, with the result that these flip-flops are rendered vulnerable to clock pulses. Accordingly, these flip-flops start counting the quarter frequency pulses applied to the gate 41b through the gate 72 from the output of the second period counter flip-flop 52.

The up-down counter 36 continues to count up until the trailing edge of the sack passes the sensor 20, which results in the opening of the sensor switch 78. Accordingly, the output of the monostable circuit 82 goes low. As a result, the flip-flops 41a–44a stop counting, due to the low signal at the J–K inputs of these flip-flops. The up-count is preserved in the states of the flip-flops.

The period counter 38 continues to count. At the count of forty-four, the gate 124 is activated so that the transistor 128 is rendered conductive. Accordingly, the induction control relay coil 126 is energized, so that the next sack is dropped upon the conveyor 10 by the induction device 16.

At the count of sixty, the gate 104 causes the reversing control flip-flop 102 to go high, with the result that the down gates 41c–44c are activated, while the up gates 41b–44b are rendered inactive. The Q output from the flip-flop 102 also drives the monostable 82 to a high output condition, so that the flip-flops 41a–44a are again rendered vulnerable to the clock pulses. Accordingly, the counter 36 starts counting down in response to the half frequency clock pulses applied to the gate 41c by the output of the first counter stage 51. These half frequency pulses are at double the frequency of the quarter frequency pulses employed for counting up. Thus, the down count proceeds twice as fast as the up count. The down count is started when the leading edge of the sack reaches the CODE ACCEPT position of FIG. 1, corresponding to a count of sixty. When the counter 36 has counted down to 0, the center of the sack is at the CODE ACCEPT position.

The delay control flip-flop is arranged to be actuated at the count of sixty-four, so that the 0 sense and reset flip-flop 108 is rendered vulnerable to the $\overline{Q}$ output of the last counter flip-flop 44a. At the count of 0, the $\overline{Q}$ output causes the 0 sense flip-flop to complement, with the result that all of the other flip-flops are reset. Accordingly, the other flip-flops are returned to their natural states. The resetting of the delay control flip-flop 110 is employed to supply a pulse to the transistor 114 through the capacitor 118. Accordingly, the CODE ACCEPT relay coil 112 is energized. This occurs at the count of 0 on the down count. At this time, the center of the sack is passing the CODE ACCEPT position, as shown in FIG. 1. After an appropriate delay, as determined by the destination code entered on the coder 18 by the operator for the particular sack, the corresponding paddle 30 is actuated so that it sweeps the sack off the conveyor 10 and onto the appropriate branch conveyor. Due to the fact that the center of the sack has been located by the computer, the paddle 30 is perfectly timed so that it engages the sack on center. Thus, there is no twisting or turning of the sack as it is swept off the conveyor. The sack is swept directly upon the appropriate branch conveyor with a high degree of precision. The center finding computer obviates the problems experienced in the past in connection with inaccurate timing of the paddle, sometimes resulting in the dumping of a sack off the main conveyor 10 and upon the floor, rather than upon the appropriate branch conveyor.

It will be recognized that the sack center finding computer makes it possible for the conveyor system to operate with a high degree of precision, so that the sacks are swept directly from the main conveyor and upon the appropriate branch conveyor, without any spillage of the sacks. The use of integrated circuits makes it possible to construct the computer on a compact and economical basis.

It will be understood by those skilled in the art that the values of the various illustrated components may be varied widely, to suit varying needs. However, it may be helpful to offer the following table giving one possible set of values for the various components:

| Resistors: | Values in ohms |
|---|---|
| 66 | 1K |
| 70 | 4.7K |
| 92 | 1K |
| 96 | 330 |
| 100 | 4.7K |
| 106 | 2K |
| 120 | 330 |
| 122 | 4.7K |
| 130 | 330 |
| 132 | 4.7K |

| Capacitors: | Values |
|---|---|
| 90 | microfarads 10 |
| 94 | picofarads 100 |
| 118 | microfarads 20 |

Various other modifications, alternative constructions and equivalents may be employed without departing from the true spirit and scope of the invention, as exemplified in the foregoing description and defined in the following claims.

I claim:
1. Conveyor apparatus,
comprising a conveyor for carrying a series of objects at a predetermined speed,
induction means for depositing the successive objects on said conveyor,
a sensor for sensing the passage of the leading and trailing edges of each object along said conveyor,
an up-down counter,
a source of normal frequency clock pulses and double frequency clock pulses,
first means operable by said sensor in response to the the passage of the leading edge of each object for causing said counter to start counting up in response to said normal frequency pulses,
second means operable by said sensor in response to the passage of the trailing edge of each object for causing said counter to stop counting said normal frequency pulses,
third means responsive to movement of said object to a predetermined position along said conveyor for causing said counter to start counting down in response to said double frequency pulses,
and fourth means for initiating a control function when said counter has counted down to a count of zero, whereby said control function is timed in accordance with the position of the center of the object.

2. Conveyor apparatus according to claim 1,
in which said up-down counter comprises a series of binary counter stages with up-counting gates connected between said stages,
and alternatively operable down-counting gates connected between said stages.

3. Conveyor apparatus according to claim 2,
in which said third means comprises an electronic switching device for activating said down-counting gates while deactivating said up-counting gates.

4. Conveyor apparatus according to claim 1,
in which said source comprises a period counter having a plurality of stages,
an alternating current source,
and means for supplying input pulses from said alternating current source to the input of said period counter.

5. Conveyor apparatus according to claim 4,
comprising means for deriving said double frequency clock pulses from one of said stages of said period counter,
and means for deriving said normal frequency clock pulses from the next stage of said period counter.

6. Conveyor apparatus according to claim 1,
in which said up-down counter comprises a plurality of binary counting stages with up-counting gates and down-counting gates connected to the inputs of said stages,
said normal frequency clock pulses being supplied to the up-counting gate for the first stage while said double frequency clock pulses are supplied to the down-counting gate for the first stage.

7. Conveyor apparatus according to claim 6,
in which said third means comprise an electronic switching device for activating said up-counting gates while deactivating said down-counting gates.

8. Conveyor apparatus according to claim 7,
in which said third means also comprise an electronic timer for actuating said electronic switching device after a predetermined time has elapsed after the operation of said sensor by the passage of the leading edge of the object.

9. Conveyor apparatus according to claim 8,
in which said electronic timer comprises a period counter,
a source of alternating current,
and means for supplying input pulses from said source to the input of said period counter.

10. Conveyor apparatus according to claim 9,
in which said period counter comprises a series of binary stages,
said source including means for deriving said double frequency clock pulses and said normal frequency clock pulses from successive stages of said period counter.

11. Conveyor apparatus according to claim 1,
in which said third means comprise a period counter having a series of binary stages,
and means for supplying input pulses to said period counter,
said first means comprising electronic switching means for activating said up-down counter and said period counter.

12. Conveyor apparatus according to claim 11,
in which said source comprises means for deriving said double frequency clock pulses and said normal frequency clock pulses from successive stages of said period counter.

13. Conveyor apparatus according to calim 11,
in which said electronic switching means comprise a first electronic switch for activating said up-down counter,
and a second electronic switch for activating said period counter.

14. Conveyor apparatus according to claim 13,
in which said second means comprise means for causing said first electronic switch to activate said up-down counter.

15. Conveyor apparatus according to claim 14,
in which said third means comprise a third electronic switch operable in response to the attainment of a predetermined count by said period counter for causing said first electronic switch to reactivate said up-down counter while causing said up-down counter to count down.

16. Conveyor apparatus to claim 15,
in which said up-down counter comprises a series of binary counters with up-counting gates and down-counting gates connected therebetween,
said third electronic switch being constructed and arranged to activate said down-counting gates while deactivating said up-counting gates.

17. Conveyor apparatus according to claim 16,
in which said fourth means comprise a fourth electronic switch connected to the output of said up-down counter and including means for resetting said period counter and said up-down counter.

18. Conveyor apparatus according to claim 17,
in which said fourth electronic switch also includes means for resetting said first, second and third electronic switches.

19. A counter according to claim 17,
including a fifth electronic switch connected to said period counter for delaying the activation of said fourth electronic switch until said period counter attains a count greater than said predetermined count.

20. Conveyor apparatus according to claim 1,
in which said third means comprise a period counter, means for supplying input pulses of said period counter, and an electronic switch for causing said up-down counter to start counting down in response to attainment of a predetermined count by said period counter.

21. Conveyor apparatus according to claim 20,
in which said fourth means comprise another electronic switch for initiating the control function when said up-down counter has counted down to zero,
and still another electronic switch for inhibiting said last mentioned electronic switch until said period counter attains a count greater than said predetermined count to prevent any possible actuation of said last mentioned electronic switch on the up count.

References Cited
UNITED STATES PATENTS

| | | |
|---|---|---|
| 3,096,871 | 7/1963 | Anderson. |
| 3,242,342 | 3/1966 | Gabar. |

EDWARD A. SROKA, Primary Examiner